United States Patent
Lepaksha et al.

(10) Patent No.: US 12,443,713 B2
(45) Date of Patent: Oct. 14, 2025

(54) SYSTEMS AND METHODS FOR DEFENDING AGAINST SIDE CHANNEL ATTACKS TO SPECULATIVE EXECUTION OF PROCESSOR PIPELINE INSTRUCTIONS

(71) Applicant: QUALCOMM Incorporated, San Diego, CA (US)

(72) Inventors: Hithesh Hassan Lepaksha, Hyderabad (IN); Darshan Kumar Nandanwar, Bangalore (IN); Kartik Gunvantbhai Desai, Savarkundla (IN); Sagar Bamashetti, Chadchan (IN)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 18/595,244

(22) Filed: Mar. 4, 2024

(65) Prior Publication Data
US 2025/0278489 A1   Sep. 4, 2025

(51) Int. Cl.
*G06F 21/56*   (2013.01)
*G06F 21/55*   (2013.01)

(52) U.S. Cl.
CPC .......... *G06F 21/566* (2013.01); *G06F 21/554* (2013.01)

(58) Field of Classification Search
CPC .............................. G06F 21/566; G06F 21/554
See application file for complete search history.

(56) References Cited

U.S. PATENT DOCUMENTS

| | | | | |
|---|---|---|---|---|
| 6,081,887 A * | 6/2000 | Steely, Jr. | ............. | G06F 9/3844 712/239 |
| 9,177,153 B1 * | 11/2015 | Perrig | ..................... | G06F 21/57 |
| 10,409,600 B1 * | 9/2019 | Sierra | ................. | G06F 12/1475 |
| 2002/0073301 A1 * | 6/2002 | Kahle | ................... | G06F 9/3846 712/E9.056 |
| 2018/0107823 A1 * | 4/2018 | Samadani | ........... | G06F 9/30145 |

(Continued)

FOREIGN PATENT DOCUMENTS

WO    WO-2025124522 A1 *   6/2025   ............... G06F 9/38

OTHER PUBLICATIONS

Carlson, Trevor "A Next-Generation Side-Channel Detector for General-Purpose Processors", Department of Computer Science, National University of Singapore, p. 1-2 (Year: 2023).*

*Primary Examiner* — Christopher A Revak
(74) *Attorney, Agent, or Firm* — Seyfarth Shaw LLP

(57) ABSTRACT

A method includes executing a first pointer authentication instruction, including a first pointer authentication code, on a pointer in a speculative path of a pipeline. The method also includes determining whether the first pointer authentication code for the pointer fails. The method further includes determining whether the first pointer authentication code for the pointer differs from a previous pointer authentication code for the pointer in response to the first pointer authentication code failing. The method still further includes incrementing a failure counter in response to determining that the first pointer authentication code for the pointer failed and that the first pointer authentication code for the pointer differs from the previous pointer authentication code for the pointer. The method additionally includes determining whether the failure counter is greater than a threshold value and performing a defensive action in response to the failure counter being greater than the threshold value.

20 Claims, 10 Drawing Sheets

(56) References Cited

U.S. PATENT DOCUMENTS

| | | | |
|---|---|---|---|
| 2020/0073669 A1* | 3/2020 | Clouqueur | G06F 9/3806 |
| 2020/0082070 A1* | 3/2020 | Semeria | G06F 21/125 |
| 2024/0086526 A1* | 3/2024 | Iles | G06F 21/52 |
| 2025/0094567 A1* | 3/2025 | Pape | G06F 9/3806 |

* cited by examiner

600

| TRACKER | | |
|---|---|---|
| PAUTH Pointer | Last PAUTH Code | Speculative PAUTH Fails |
| P1 | ABC | *A* |
| P2 | 123 | *B* |
| ... | ... | ... |
| P*n* | FED | *X* |

SYSTEMS AND METHODS FOR DEFENDING AGAINST SIDE CHANNEL ATTACKS TO SPECULATIVE EXECUTION OF PROCESSOR PIPELINE INSTRUCTIONS

FIELD OF THE DISCLOSURE

Aspects of the present disclosure generally relate to speculative execution of processor pipeline instructions, and more particularly to systems and methods for defending against pointer authentication code attacks during speculative execution.

BACKGROUND

Speculative execution is a computing technique to enhance the processing of instructions by a processor, such as a central processing unit (CPU), for example. During speculative execution, the processor predicts a next branch in program code and executes instructions based on the prediction. The prediction is made and executed before the processor has resolved the actual outcome of the current branch. If the prediction turns out to be correct, the speculative execution gives a significant performance boost as the processor has already performed necessary work based on the prediction. However, if the prediction is incorrect, the processor discards the results of the speculated instructions, and the processor executes the correct branch of the program code. It would be desirable to prevent attacks to the processor during speculative execution.

SUMMARY

In some aspects of the present disclosure, a method includes executing a first pointer authentication instruction on a pointer in a speculative path of a pipeline, the first pointer authentication instruction including a first pointer authentication code. The method also includes determining whether the first pointer authentication code for the pointer fails. The method further includes determining whether the first pointer authentication code for the pointer differs from a previous pointer authentication code for the pointer in response to the first pointer authentication code failing. The method still further includes incrementing a failure counter in response to determining that the first pointer authentication code for the pointer failed and that the first pointer authentication code for the pointer differs from the previous pointer authentication code for the pointer. The method additionally includes determining whether the failure counter is greater than a threshold value and performing a defensive action in response to the failure counter being greater than the threshold value.

Other aspects of the present disclosure are directed to an apparatus. The apparatus has at least one memory and one or more processors coupled to the at least one memory. The processor(s) is configured to execute a first pointer authentication instruction on a pointer in a speculative path of a pipeline, the first pointer authentication instruction including a first pointer authentication code. The processor(s) is further configured to determine whether the first pointer authentication code for the pointer fails. The processor(s) is also configured to determine whether the first pointer authentication code for the pointer differs from a previous pointer authentication code for the pointer in response to the first pointer authentication code failing. The processor(s) is also configured to increment a failure counter in response to determining that the first pointer authentication code for the pointer failed and that the first pointer authentication code for the pointer differs from the previous pointer authentication code for the pointer. The processor(s) is additionally configured to determine whether the failure counter is greater than a threshold value. The processor(s) is also configured to perform a defensive action in response to the failure counter being greater than the threshold value.

In still other aspects of the present disclosure, a non-transitory computer-readable medium with program code recorded thereon is disclosed. The program code is executed by at least one processor and includes program code to execute a first pointer authentication instruction on a pointer in a speculative path of a pipeline, the first pointer authentication instruction including a first pointer authentication code. The program code also includes program code to determine whether the first pointer authentication code for the pointer fails. The program code further includes program code to determine whether the first pointer authentication code for the pointer differs from a previous pointer authentication code for the pointer in response to the first pointer authentication code failing. The program code still further includes program code to increment a failure counter in response to determining that the first pointer authentication code for the pointer failed and that the first pointer authentication code for the pointer differs from the previous pointer authentication code for the pointer. The program code additionally includes program code to determine whether the failure counter is greater than a threshold value. The program code further includes program code to perform a defensive action in response to the failure counter being greater than the threshold value.

Other aspects of the present disclosure are directed to an apparatus. The apparatus includes means for executing a first pointer authentication instruction on a pointer in a speculative path of a pipeline, the first pointer authentication instruction including a first pointer authentication code. The apparatus also includes means for determining whether the first pointer authentication code for the pointer fails. The apparatus further includes means for determining whether the first pointer authentication code for the pointer differs from a previous pointer authentication code for the pointer in response to the first pointer authentication code failing. The apparatus still further includes means for incrementing a failure counter in response to determining that the first pointer authentication code for the pointer failed and that the first pointer authentication code for the pointer differs from the previous pointer authentication code for the pointer. The apparatus additionally includes means for determining whether the failure counter is greater than a threshold value. The apparatus also includes means for performing a defensive action in response to the failure counter being greater than the threshold value.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIG. 6 illustrates a pointer authentication (PAUTH) tracker table, in accordance with various aspects of the present disclosure.

DETAILED DESCRIPTION

Figure 1:
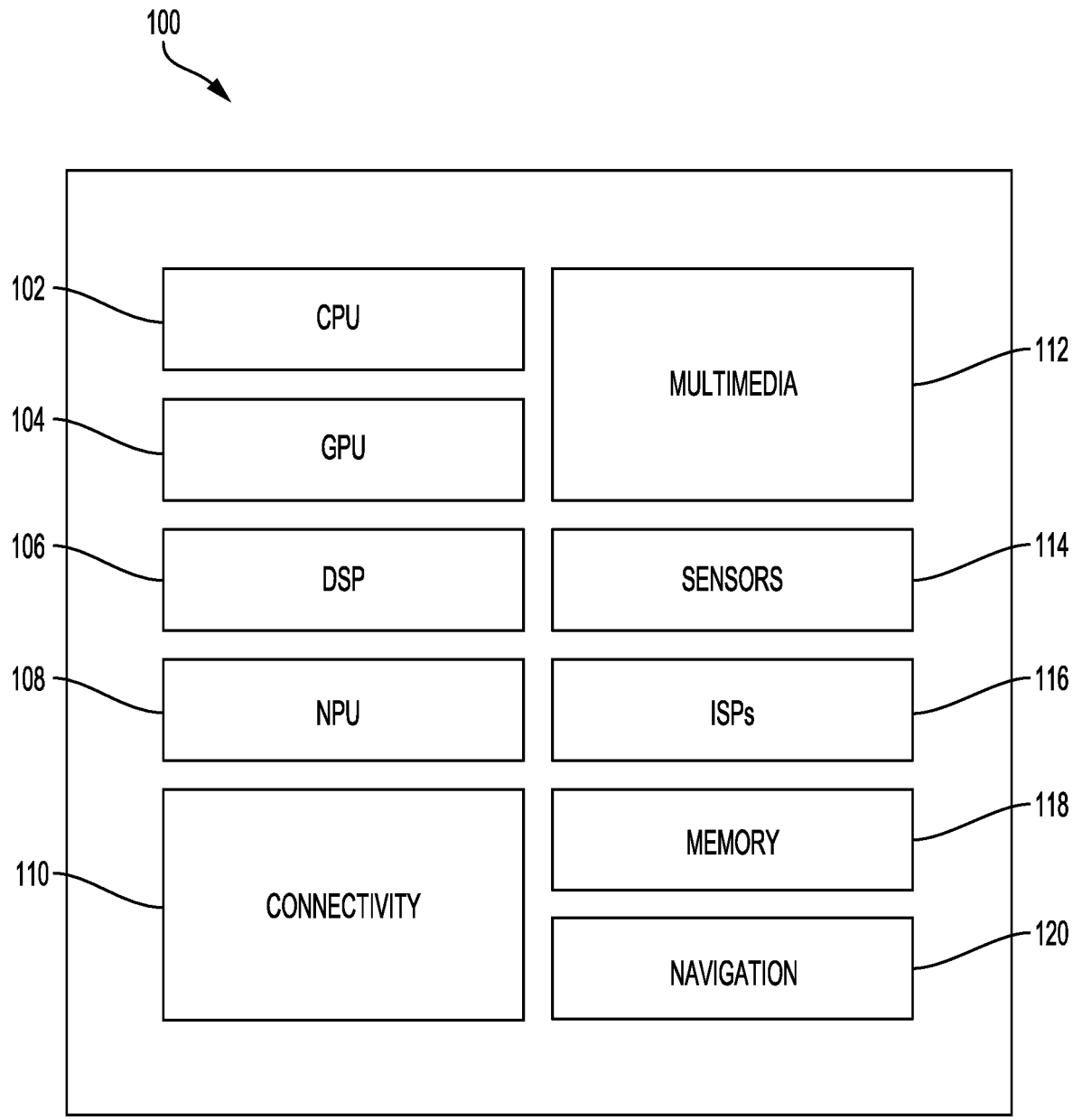
FIG. 1 illustrates an example implementation of a system-on-a-chip (SOC), in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used to mean "serving as an example, instance, or illustration." Any aspect described as "exemplary" is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks, and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

As described, speculative execution is a computing technique to enhance the processing speed of instructions by a processor core, such as a central processing unit (CPU) core. Speculative execution predicts the paths of branching instructions within a program and executes future instructions before determining the results of a current instruction. By executing future instructions before determining the results of a current instruction, the core utilizes resources more efficiently, reducing idle time and increasing throughput. A core may implement hardware and software components to perform speculative execution. For example, the core may implement a branch predictor configured to predict a future instruction based on past instructions. The core may also implement a speculative engine configured to execute the instructions predicted by the branch predictor. Speculative execution has become a common aspect of core design, contributing significantly to performance improvements in a wide range of computing applications.

Some instruction executions involve pointer authentication. Pointer authentication (PAUTH) is a security feature implemented in modern processors that adds a cryptographic code to pointers-a type of variable used to store memory addresses. The code, referred to as a pointer authentication code (PAC), validates the pointer as not having been tampered with, before the pointer is de-referenced. If the PAC does not match a cryptographic signature associated with the pointer, operations using the pointer are halted, thus preventing the exploitation of vulnerabilities such as buffer overflows that are commonly used in attacks to corrupt memory and gain unauthorized access to systems.

Speculative execution has introduced a variety of security implications, as demonstrated by vulnerabilities to side channel attacks. Spectre, PACMAN, and Meltdown are examples of side channel attacks. One vulnerability, referred to as a PACMAN attack, utilizes speculative execution of a pointer authentication instruction in order to predict a pointer authentication code. During a PACMAN attack, an attacker causes a core to speculatively execute a pointer authentication instruction with a pointer authentication code. The attacker can measure core side channel signatures, such as memory latency associated with the pointer authentication execution, to determine whether the pointer authentication code is successful. Because the PACMAN attack occurs during speculative execution, the core is unable to detect and react to failed pointer authentication instructions. The core therefore has insufficient protection to prevent the attacker from implementing a side channel attack, such as a PACMAN attack, to guess valid pointer authentication codes.

Various aspects of the present disclosure are directed to techniques for defending against side channel attacks. In some aspects, a core implements an instruction pipeline. If the instruction pipeline speculatively executes a pointer authentication instruction on a pointer using a pointer authentication code, the instruction pipeline first determines if the pointer authentication code fails (e.g., the pointer authentication code does not match the provided pointer). If the pointer authentication code fails, the instruction pipeline then determines whether the failed pointer authentication code differs from a previous failed pointer authentication code for the pointer. Next, if the failed pointer authentication code differs from a previous failed pointer authentication code for the pointer, the instruction pipeline may increment a failure counter.

The instruction pipeline may perform any number of defensive actions based on the value of the failure counter exceeding a threshold. For example, the instruction pipeline may mask latency associated with speculatively executed pointer authentication instructions. Additionally, or alternatively, the instruction pipeline may issue a jump instruction to perform remaining instructions in a sandbox environment (e.g., a quarantined area in code space). The defensive actions may also include refusing speculative execution of additional pointer authentication instructions. Because the defensive actions only engage once the failure counter exceeds a threshold, the core may otherwise operate normally, allowing the core to preserve resources when the core is not experiencing an attack. The combination of attack detection techniques and defensive actions provide substantial protection against side channel attacks.

Particular aspects of the subject matter described in this disclosure can be implemented to realize one or more of the following potential advantages. In some examples, the described techniques, such as performing a defensive action based on a failure counter associated with failed speculatively executed pointer authentication instructions, enables a core pipeline to detect and protect against various types of side channel attacks, such as PACMAN attacks. Other advantages include a defensive mechanism to track, detect, and protect against speculative execution-based pointer manipulation attacks. Additionally, the core front end may implement the techniques to differentiate between a pointer authentication instruction executed in an unresolved branch or in a speculative path and a normal pointer authentication execution without speculations or predictions. Therefore, the defensive techniques may only be executed during an unresolved branch or speculative path, preserving core resources.

FIG. 1 illustrates an example implementation of a system-on-a-chip (SOC) 100, which may include a central processing unit (CPU) 102 or a multi-core CPU susceptible to a side channel attack. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU 108 is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM, RISC-V (RISC-five), or any reduced instruction set computing (RISC) architecture. In aspects of the present disclosure, the instructions loaded into the CPU 102 may include code to execute a first pointer authentication instruction on a pointer in a speculative path of a pipeline, the first pointer authentication instruction including a first pointer authentication code. The instructions loaded into the CPU 102 may also include code to determine whether the first pointer authentication code for the pointer fails. The instructions loaded into the CPU 102 may additionally include code to determine whether the first pointer authentication code for the pointer differs from a previous pointer authentication code for the pointer in response to the first pointer authentication code failing. The instructions loaded into the CPU 102 may further include code to increment a failure counter in response to determining that the first pointer authentication code for the pointer failed and that the first pointer authentication code for the pointer differs from the previous pointer authentication code for the pointer. Additionally, the instructions loaded into the CPU 102 may include code to determine whether the failure counter is greater than a threshold value. The instructions loaded into the CPU 102 may also include code to perform a defensive action in response to the failure counter being greater than the threshold value.

Figure 2:
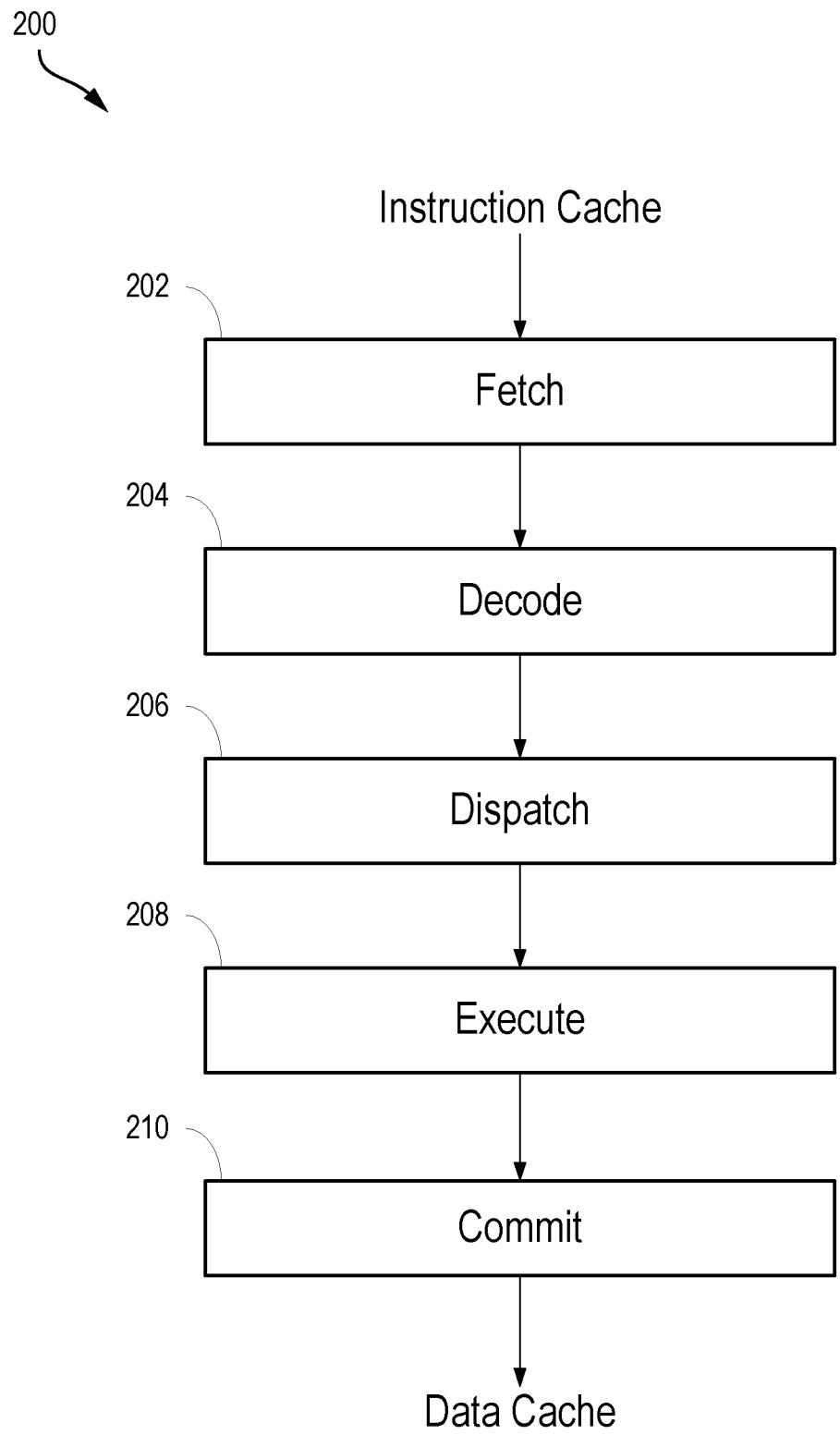
FIG. 2 is a flow diagram illustrating an example instruction pipeline.

FIG. 2 is a flow diagram illustrating an example instruction pipeline 200. The instruction pipeline 200 may be performed by a processor, such as the CPU 102 illustrated in FIG. 1. As illustrated in FIG. 2, the instruction pipeline 200 receives an instruction cache as input and outputs a data cache. The instruction pipeline 200 includes a fetch stage 202, a decode stage 204, a dispatch stage 206, an execute stage 208, and a commit stage 210. After the fetch stage 202 receives the instruction cache as input, each following stage receives data processed in the previous stage.

The instruction pipeline 200 begins at the fetch stage 202 by fetching the instruction cache from system memory. The instruction cache may pertain to operations performed by the instruction pipeline 200. For example, the CPU 102 may fetch instructions from a memory, such as cache registers or the memory block 118. The instructions may be any type of instruction that the CPU 102 is able to execute, including an arithmetic operation such as ADD (to add two numbers), a control instruction such as JMP (to jump to a different part of the program code), or a memory operation such as LOAD (to read data from memory) or STORE (to write data to memory). The specific instruction fetched by the CPU 102 may depend on the current state of a program counter (PC) that points to the address of the next instruction to be executed.

At the decode stage 204, the instruction pipeline 200 interprets the instruction cache fetched at the fetch stage 202. The interpretation may be performed by a binary decoder within the CPU 102. How the instruction cache is interpreted depends on the processor's instruction set architecture (ISA). After the instruction cache is interpreted at the decode stage 204, the resulting instruction information is transmitted to appropriate logic units at the dispatch stage 206. For example, the CPU 102 may transmit the instruction information to an internal reorder buffer (ROB), and the ROB may disseminate the instruction information to various components within the CPU 102.

At the execute stage 208, the instruction pipeline 200 executes the interpreted instructions. For example, individual logic units within the CPU 102 may perform operations assigned by the ROB. Once a result is calculated, the result is written to memory as a data cache at the commit stage 210. Although the example instruction pipeline 200 illustrated with respect to FIG. 2 includes five stages, some computational pipelines are conceptualized as having more than or fewer than five stages. Additionally, each stage within the instruction pipeline 200 may contain various sub-stages.

Figure 3:
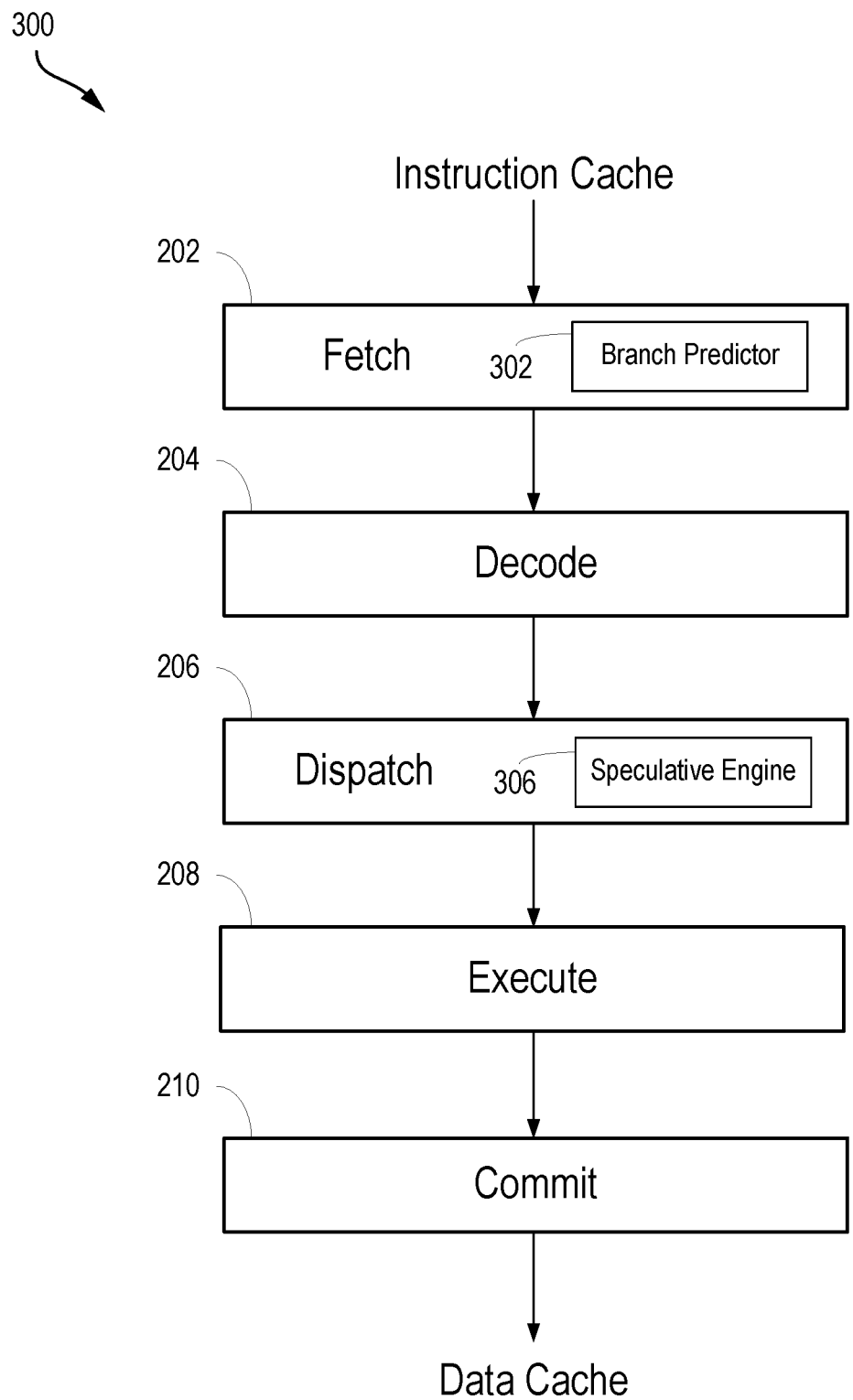
FIG. 3 is a flow diagram illustrating an example instruction pipeline implementing speculative execution.

FIG. 3 is a flow diagram illustrating an example instruction pipeline 300 implementing speculative execution. As shown in FIG. 3, the instruction pipeline 300 is similar to the instruction pipeline 200 discussed with respect to FIG. 2. The instruction pipeline 300 includes the fetch stage 202, the decode stage 204, the dispatch stage 206, the execute stage 208, and the commit stage 210. The stages of the instruction pipeline 300 incorporate two additional components: a branch predictor 302 utilized during the fetch stage 202 and a speculative engine 306 utilized during the dispatch stage 206.

For context, the instruction pipeline 300 specifies a continuous stream of operations in order to provide increased throughput and instructions per clock (IPC). However, the execution flow of the instruction pipeline 300 may stall due to being dependent on the result of a previous instruction. For example, the instruction pipeline 300 may stall due to unavailability of data or a lack of branch resolution, causing the instruction pipeline 300 to enter a WAIT/STALL state. The WAIT/STALL state degrades system performance because computational structures are waiting for further instructions rather than computing a result.

In an attempt to prevent a loss of performance associated with the WAIT/STALL state, the instruction pipeline 300 includes speculative components. The speculative components probabilistically improve performance of the instruction pipeline 300 by predicting missing data and making a speculative execution based on the predicted data. To predict the missing data and make the speculative execution, the instruction pipeline 300 implements the branch predictor 302 and the speculative engine 306.

During the fetch stage 202, the branch predictor 302 makes an intelligent guess about a future branch. The guess is based on the execution of past branches in the code. For example, if the instruction pipeline 300 is executing a loop in program code, the branch predictor 302 may guess that the next branch is another iteration of the loop. In this example, the instruction pipeline 300 may be completing the fifth iteration of the loop at the execute stage 208 while concurrently fetching instructions for a sixth iteration of the loop at the fetch stage 202 based on the intelligent guess. Before the instruction pipeline 300 moves on to speculative execution at the dispatch stage 206, the instruction pipeline 300 saves the current context (e.g., the current state of the instruction pipeline 300) as a saved context.

At the dispatch stage 206, the speculative engine 306 executes instructions based on the intelligent guess made at the fetch stage 202. For instance, if the branch predictor 302 predicts that the next instruction pertains to a sixth iteration of a loop in program code, the instructions for the sixth iteration of the loop are loaded into the instruction pipeline 300 at the fetch stage 202 before the dependency on the fifth iteration of the loop is resolved with an output. Then, the predicted instruction is dispatched at the dispatch stage 206 and executed by the speculative engine 306.

If the prediction matches the accurate data produced by the previous branch, the speculatively executed result is committed to memory at the commit stage 210. If the prediction does not match the accurate data produced by the previous branch, the instruction pipeline 300 discards the speculatively executed result and the instruction pipeline 300 is flushed. Then, the saved context is loaded into the instruction pipeline 300 to restore the pipeline to the point before speculation. The accurate data is loaded, and the instructions are re-executed.

Speculative execution of instructions significantly increases processor performance. However, speculative execution also leaves observable signatures in the processor. The observable signatures leave the processor vulnerable to side channel attacks such as Spectre attacks, Meltdown attacks, and the PACMAN attacks that are discussed with respect to FIGS. 4A and 4B.

Figure 4A:
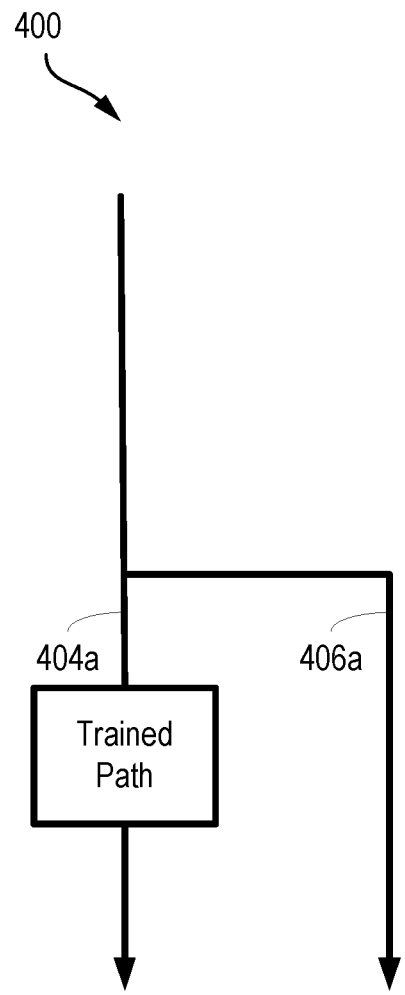
FIGS. 4A and 4B are block diagrams illustrating speculative execution during a side channel attack.
Figure 4B:
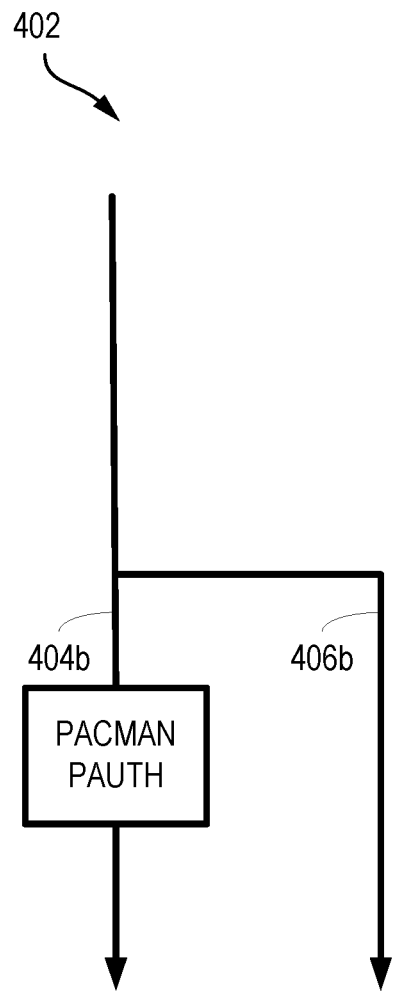

FIGS. 4A and 4B illustrate speculative execution during a side channel attack. As shown in FIG. 4A, a first fork 400 includes a first path 404a and a second path 406a. Similarly, as shown in FIG. 4B, a second fork 402 includes a first path 404b and a second path 406b. Each path in the first fork 400 and second fork 402 represents a path for an instruction pipeline, such as the instruction pipeline 300 illustrated with respect to FIG. 3, to take during speculative execution. For instance, the instruction pipeline 300 may speculatively execute the first path 404a only for the branch prediction to turn out wrong, revealing that the second path 406a is the correct path.

FIGS. 4A and 4B pertain to a specific example of a side channel attack referred to as a PACMAN attack. PACMAN attacks use malicious software to brute-force pointer authentication codes (PACs). The brute-force technique uses speculative execution to create an "oracle" for determining a correct PAC. By determining a correct PAC, an attacker can potentially bypass protection provided by pointer authentication (PAUTH), e.g., by conducting return-oriented programming (ROP) or jump-oriented programming (JOP) attacks. ROP and JOP attacks implement "gadgets" made up of pieces of existing software routines. The gadgets can then be used conduct further attacks. Many conventional core designs are vulnerable to such attacks.

In vulnerable core designs, a failed pointer authentication instruction modifies the associated pointer in such a way that a de-reference leads to a translation fault. Therefore, the occurrence of the translation fault implies a failed authentication rather than a passed authentication. Both the failed authentication and the passed authentication create different micro-architectural side effects that can be observed by the oracle in order to infer whether a pointer authentication code is associated with a pointer. Example micro-architectural side effects that may indicate a pointer authentication code failure include effects pertaining to translation lookaside buffers (TLB) and cache allocations. These effects can be observed with timing measurements.

Conventional processors include countermeasures to prevent an attacker from inferring pointer authentication codes via micro-architectural side effects. For example, if the processor detects the execution of an incorrect pointer authentication code, the processor may abort execution and discard the instructions. However, during a PACMAN attack, the attacker causes the execution of the pointer authentication instruction to occur under speculation, e.g., via a mis-predicted branch, without risking countermeasures. The speculative execution of the pointer authentication instruction allows the attacker to invoke the oracle with different pointer authentication codes until a valid pointer authentication code is identified. The attacker may then use the valid pointer authentication code to conduct subsequent attacks. Although disabling speculative execution may prevent PACMAN attacks, disabling speculative execution would also significantly reduce processor performance.

To conduct a PACMAN attack, an attacker creates a PACMAN gadget. The PACMAN gadget is program code that includes a pointer verification operation that speculatively verifies the validity of a guessed pointer authentication code. The PACMAN gadget also includes a transmission operation that speculatively transmits the verification result via a micro-architectural side channel. The attacker may then identify speculation paths in the program code that are susceptible to malicious training. For example, the attacker may identify program code represented by the first fork 400. In this example, the program code has two execution paths, represented by the first path 404a and the second path 406b. The program code in this example may be a loop, where the first path 404a represents iterating the loop and the second path 406b represents exiting the loop. Because the program code has two paths, and the attacker may cause the instruction pipeline 300 to take a certain path, the program code is susceptible to malicious training.

Next, the attacker may train the instruction pipeline 300 by causing the pipeline to execute program code that uses one path. For example, the attacker may execute a loop in the program code, the loop having five iterations. For each of the five iterations, the instruction pipeline 300 selects the first path 404a. Because the branch predictor 302 makes predictions based on previously executed program code, the branch predictor 302 likely predicts that the next operation is a sixth iteration of the loop. Therefore, during the fifth iteration of the loop, the attacker has successfully trained the instruction pipeline 300 to execute a predictable control flow by causing the branch predictor 302 to guess that the next operation is a sixth iteration of the loop. In this example, the sixth iteration of the loop is the trained path, illustrated by the first path 404a.

The next phase in the attack is illustrated by the second fork 402. During the fifth iteration of the loop, the instruction pipeline 300 speculatively executes the sixth iteration of the loop at the first path 404b. The attacker then inserts the PACMAN gadget into the speculatively executed program code. In this example, because the branch predictor 302 has predicted the next operation is a sixth iteration of the loop at the first path 404b, the attacker causes the PACMAN gadget to execute during the sixth iteration. Ultimately, the branch predictor 302 is wrong, and the correct operation is to exit the loop at the second path 406b. Therefore, the PACMAN gadget is only speculatively executed rather than normally executed. Once the instruction pipeline 300 determines that the branch predictor 302 has made an incorrect prediction, the results of the first path 404b are discarded, after the PACMAN gadget has speculatively executed.

During speculative execution, the PACMAN gadget performs a pointer authorization instruction on a given pointer. For example, the PACMAN gadget may execute a LOAD instruction, conduct pointer authentication, fetch the pointer, and indicate to other components that the fetch occurred. Although the results of the speculative execution are not committed to memory, the outcome of the pointer authentication can still be inferred via a side channel signature produced by the processor. For example, speculative execution of a successful pointer authentication often produces a smaller latency than speculative execution of an unsuccessful pointer authentication.

By measuring the amount of time the PACMAN gadget takes to speculatively execute, the attacker can predict whether the PACMAN gadget is using a correct pointer authentication code. For instance, the attacker may conduct the PACMAN attack in a first core and increment a loop in a second core to act as a timer. The attacker may additionally profile the second core for latency of memory access and other side channel behaviors. The attacker may then infer the result of the pointer authentication based on the timing, latency, and/or other side channel behaviors.

If a data fetch occurs at the pointer location after the pointer authentication, then the attacker has found a correct pointer authentication code. If the data fetch does not occur at the pointer location after the pointer authentication, the pointer authentication code is not correct, and the results of the execution are not committed to system memory. The failed pointer authentication does not cause an ABORT or FAULT instruction to issue, as the speculative execution is discarded. All pointer authentication countermeasures are suppressed, and the pipeline context is restored to a state before speculation. The attacker can then repeatedly cause the processor to speculatively execute the PACMAN gadget until a correct pointer authentication code is found.

Figure 5:
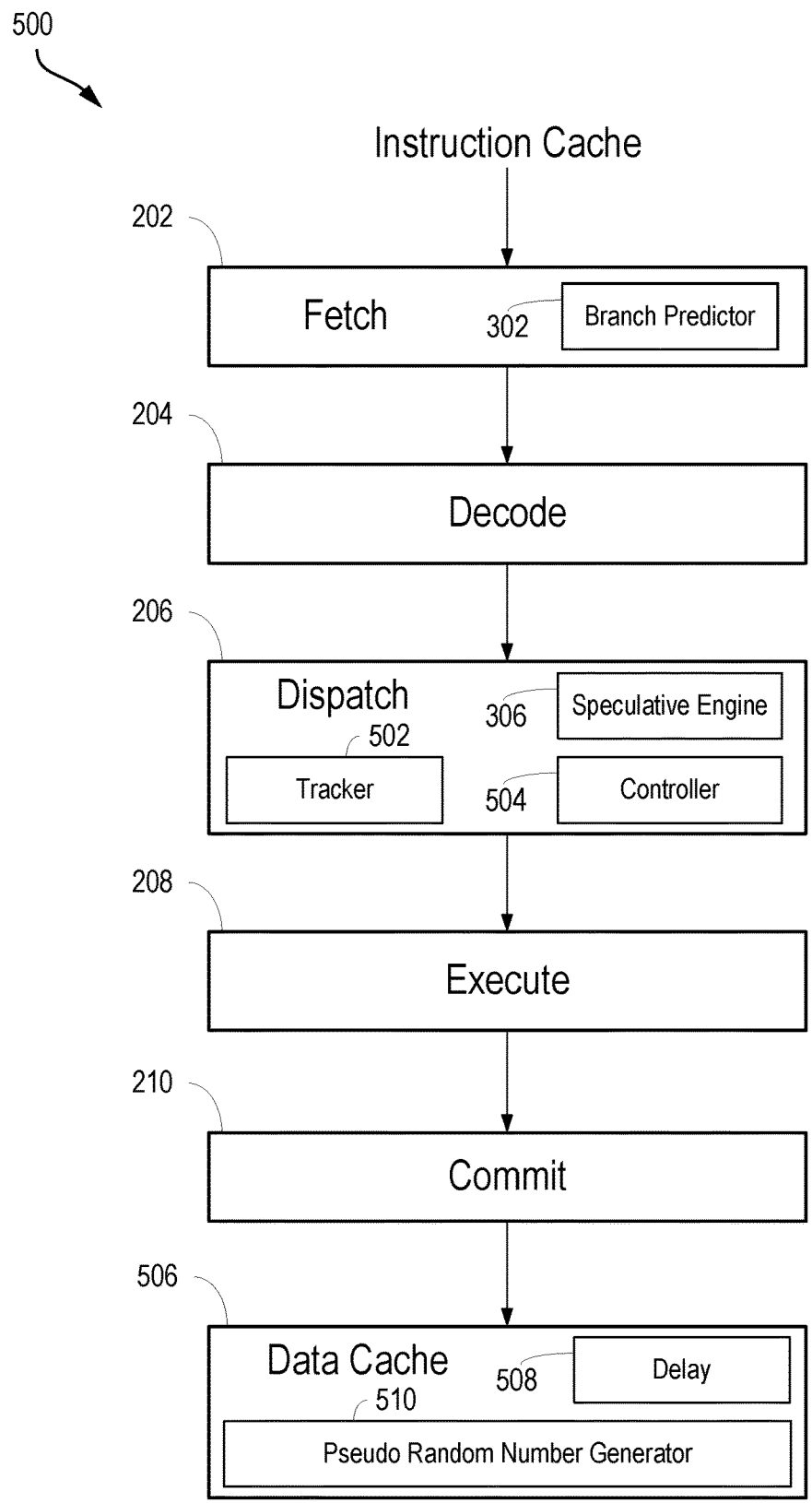
FIG. 5 is a flow diagram illustrating a defense pipeline for preventing a side channel attack, in accordance with various aspects of the present disclosure.

FIG. 5 is a flow diagram illustrating a defense pipeline 500, for preventing a side channel attack, in accordance with various aspects of the present disclosure. As shown in FIG. 5, the defense pipeline 500 includes similar stages as the instruction pipeline 300 illustrated with respect to FIG. 3. However, the defense pipeline 500 additionally implements a data cache stage 506 and various components, including a tracker 502, controller 504, delay module 508, and pseudo random number generator 510.

As discussed, PACMAN attacks generally involve speculative execution of a pointer authentication instruction on a pointer from a particular address in code space. Because PACMAN attacks are a type of brute force attack, PACMAN attacks often take many attempts to guess correct pointer authentication codes. Additionally, the implementation of the PACMAN gadget is often contingent upon the presence of susceptible areas within a codebase. The defense pipeline 500 includes protections against side channel attacks, such as PACMAN attacks, on the basis of the particularities of PACMAN attacks. Although the present disclosure is primarily described with respect to PACMAN attacks, aspects of the present disclosure also contemplate defense against other types of side channel attacks and the present disclosure is not limited to defending specifically against PACMAN attacks.

The defense pipeline 500 introduces several additions as compared to the instruction pipeline 300. At the hardware level, the additions affect a core's speculative engine, front end, and data cache to detect brute force behaviors and engage mechanisms that mask side channel signatures with controllable severity to protect against attacks. Each of the defense pipeline's 500 additional components may be either a hardware component (e.g., a micro-architectural change in hardware as compared to conventional processing cores), a software component (e.g., an additional software module not present in conventional processor instructions), or some combination of hardware and software components.

In the defense pipeline 500, the speculative engine 306 is in communication with a tracker 502. As discussed, the tracker 502 may be a hardware component within a core, or the tracker 502 may be a software module that executes at some point during the defense pipeline 500. The tracker 502 may additionally be some combination of hardware and software components. During the dispatch stage 206, the tracker 502 records pointer authentication code values, pointer addresses, and a quantity of failed pointer authentication instructions speculatively executed for each pointer. The information recorded by the tracker 502 may be visualized by a table, such as the tracker table 600 illustrated with respect to FIG. 6. The tracker 502 detects and records if the speculative engine 306 is speculatively executing a failed pointer authentication instruction for a particular pointer. By counting the quantity of instances a speculatively executed pointer authentication instruction fails for a particular pointer, the tracker 502 may detect potential attacks. For example, the count of failed pointer authentication instructions may increase above a specified threshold within a specified amount of time. Because pointer authentication instructions do not often fail at a high rate, the high rate of pointer authentication failures indicates the core is possibly being subjected to a brute force attack.

The specified threshold of failed pointer authentications may be adjustable, allowing the defense pipeline 500 to react to possible attacks with variable responsiveness. In some implementations, the specified threshold may be kept low to increase the sensitivity of the defense pipeline 500 to attacks. For example, the specified threshold may be set to one, such that a single failed pointer authentication instruction, speculatively executed, triggers countermeasures from the defense pipeline 500. The specified threshold may also be set to a higher number to decrease the sensitivity of the defense pipeline 500 to attacks. The specified threshold may be fixed at design time to provide a predictable sensitivity for brute force attacks. As the nature of the attacks evolve, it is difficult to set a single threshold value that screens for evolving attack types. Hence, the specified threshold may be designed to be configured once at the boot time by trusted firmware to meet the screening sensitivity for different types of attack vectors. For example, the specified threshold may be fixed at design time or configured via trusted software (e.g., secure firmware) configuring a control and status register associated with the controller 504.

The defense pipeline 500 additionally incorporates a data cache stage 506. During the data cache stage 506, the defense pipeline 500 may execute a defensive action in response to a possible attack. The defense pipeline 500 may incorporate modifications to core components (e.g., the level one (L1) data cache controller) in order to better execute defensive actions, such as by the delay module 508 and the pseudo random number generator 510. For example, the delay module 508 may increase the response latency for a successful pointer authentication instruction or pointer dereferencing. Additionally, or alternatively, the pseudo random number generator 510 may be configured to provide data not associated with a provided pointer (e.g., pseudo random data) as a fetch result.

FIG. 6 illustrates a pointer authentication tracker table, in accordance with various aspects of the present disclosure. The tracker table 600 may be a visual representation of information recorded by the tracker 502 discussed with respect to FIG. 5. As shown in FIG. 6, the tracker table 600 includes a pointer authentication (PAUTH) pointer column 602, a last PAUTH code column 604, and a speculative PAUTH fails column 606.

The tracker table 600 tracks the pointers and pointer authentication codes used for speculative pointer authentication. The speculative PAUTH fails column 606 acts as a failure counter for each pointer. The failure counter increments if the speculative pointer authentication for a specific pointer fails using a different pointer authentication code than the previous pointer authentication code attempted for the specific pointer. The selective incrementing of the failure counter avoids unnecessarily counting the same pointer authentication code for the same pointer, because attempting the same pointer authentication code for the same pointer in two separate speculative executions is not a brute force attack indicator. The failure counter resets to zero for a pointer if the pointer authentication code is successful. Additionally, if the pointer is successfully authorized, the tracker 502 may discard the information stored for the successfully authorized pointer.

As discussed with respect to FIG. 5, the tracker 502 records information during a pointer authentication execution in a speculative path. During a normal execution, such as a non-speculative execution, the tracker 502 is clock gated, e.g., the tracker 502 does not receive a clock signal from the core, reducing energy consumption. If the defense pipeline 500 is about to begin speculative execution of a pointer authentication instruction, a decoder, a reorder buffer, and/or a scorecard mechanism within the core causes the tracker 502 to exit the clock gated state and track the speculatively executed pointer authentication instruction. For instance, the decoder may indicate a pointer authentication instruction in the instruction stream. Then, the speculative engine 306 determines if the pointer authentication instruction executes speculatively or with unresolved branches. If the pointer authentication executes speculatively or with unresolved branches, the tracker 502 records the results of the pointer authentication, including failed pointer authentication attempts.

An example with respect to FIG. 6 will now be described. In this example, the defense pipeline 500 receives a directive to speculatively execute a pointer authentication instruction. During the decode stage 204, the decoder indicates to the speculative engine 306 that a pointer authentication instruction is in the instruction stream. After the speculative engine 306 determines that the pointer authentication instruction is to be speculatively executed, the tracker 502 is no longer clock gated. The tracker 502 then records the pointer in the PAUTH pointer column 602 as, for example, P1. The pointer authentication code included in the pointer authentication instruction is also recorded in the last PAUTH code column 604 as, for example, ABC. The tracker 502 increments a failure counter that represents the number of times each pointer fails to authenticate with a pointer authentication code that is different than the last pointer authentication code attempted for the pointer. Similarly, the failure counter increments the first time a specified pointer fails to speculatively execute, because the last pointer authentication code is not yet recorded. The failure counter is represented in the speculative PAUTH fails column 606 by the counter A. For instance, if the speculative authentication for the P1 pointer fails using the ABC pointer authentication code, then the counter A increments to one.

If the defense pipeline 500 again speculatively executes the same P1 pointer with the same pointer authentication code ABC and the speculative execution fails, then A does not increment, because ABC is the same pointer authentication code as the last pointer authentication code used for P1. The counter A does increment for each instance the defense pipeline 500 fails to speculatively execute the P1 pointer with a different pointer authentication code than the previous pointer authentication code for the P1 pointer. For example, if the defense pipeline 500 speculatively executes the P1 pointer with the pointer authentication code EFG and fails, the counter A increments to two. If the defense pipeline 500 speculatively executes the P1 pointer and succeeds, the counter A resets to zero.

If the defense pipeline 500 speculatively executes a different pointer, a separate row in the tracker table 600 records the pointer, pointer authentication code, and the number of associated successive failures. For instance, the tracker 502 may also record the P2 pointer and the most recent pointer authentication code attempted for the P2 pointer, e.g., 123. The tracker 502 then associates another counter, B, with the P2 pointer, and the counter B is tracked separately from the counter A. As illustrated by the ellipses proceeding Pn, FED, and X, the tracker 502 may continue to track any number of pointers, last used pointer authentication codes, and failure counters. It is contemplated that the tracker 502 may track individual failure counters for each pointer, as illustrated in FIG. 6, or that the tracker 502 may share a failure counter between pointers, such that one failure counter is associated with two or more pointers. For example, the defense pipeline 500 may increment a single failure counter if any one pointer authentication instruction fails to speculatively execute with a pointer authentication code for a pointer that is different than a previous pointer authentication code for that same pointer.

It is additionally contemplated that the tracker 502 may record other values in the tracker table 600. In some examples, the tracker 502 may record the number of speculative pointer authentication failures for each pointer over a period of time. For instance, the tracker 502 may record the number of speculative pointer authentication failures for the P1 pointer over the past two minutes. Additionally, or alternatively, additions to the failure counter may expire such that the speculative pointer authentication failures counter may decrement after a specified amount of time following an increment. For example, the tracker 502 may decrement the counter A by one, two minutes after the tracker 502 incremented the counter A by one.

Figure 7:
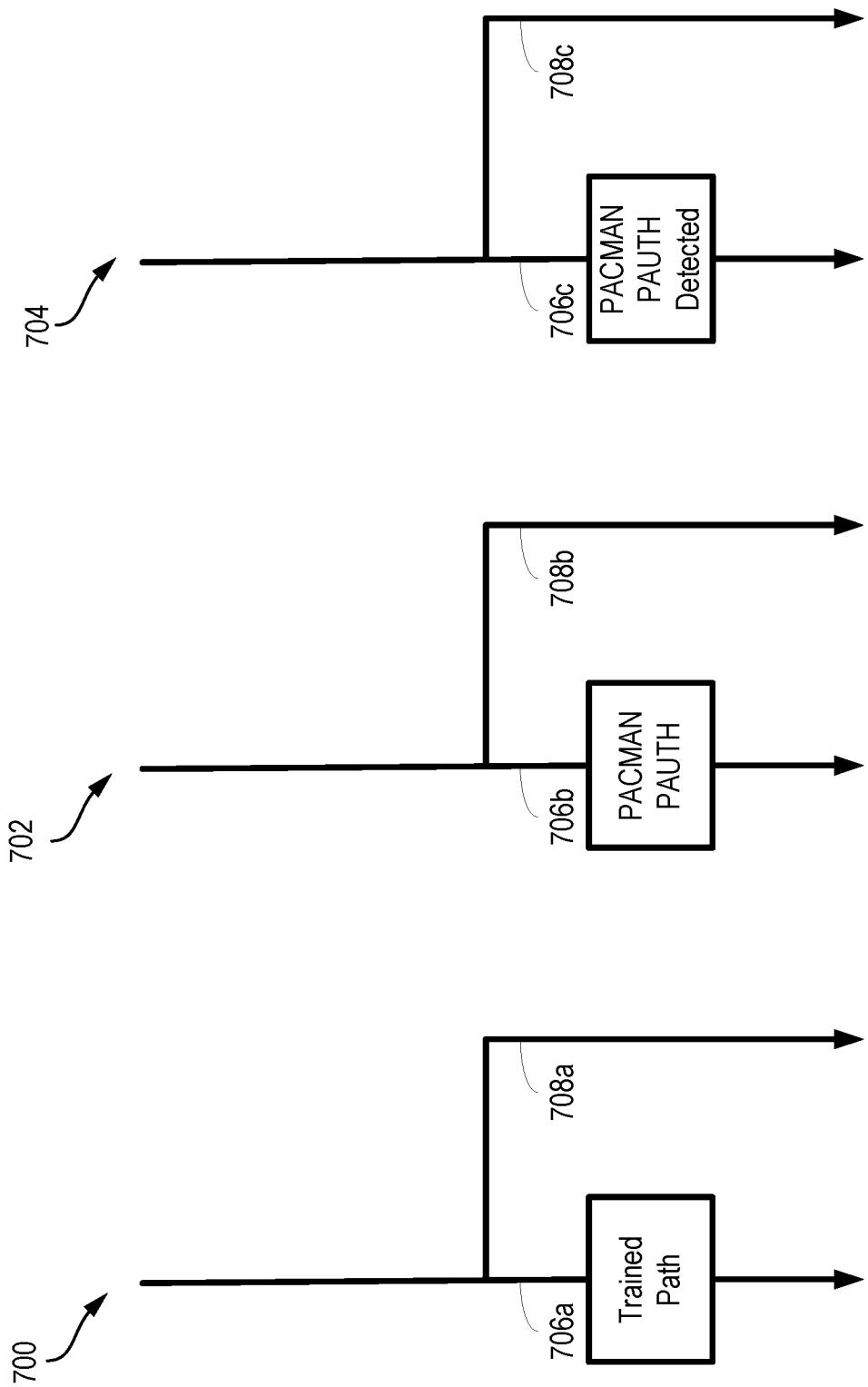
FIGS. 7A, 7B, and 7C are block diagrams illustrating speculative execution by a defense pipeline, in accordance with various aspects of the present disclosure.

FIGS. 7A, 7B, and 7C illustrate speculative execution by a defense pipeline, in accordance with various aspects of the present disclosure. FIG. 7A shows a first fork 700 with a first path 706*a* and a second path 708*a*. FIG. 7B shows a second fork 702 with a first path 706*b* and a second path 708*b*. FIG. 7C shows a third fork 704 with a first path 706*c* and a second path 708*c*. Each of the three forks illustrated with respect to FIGS. 7A, 7B, and 7C illustrate different possible phases of the defense pipeline's 500 response to an attack, for example a PACMAN attack.

As discussed with respect to FIGS. 5 and 6, the defense pipeline 500 includes a tracker 502. The tracker 502 increments a failure counter each time a pointer in a speculative path fails to authenticate with a pointer authentication code that is different than the last pointer authentication code attempted for the pointer in a speculative path. If the failure counter reaches a specified threshold value, the defense pipeline 500 may engage any number of defensive actions. The defensive actions may be engaged during the current speculative execution of a pointer authentication instruction or a following speculative execution of a pointer authentication instruction.

Additionally, the threshold value may be some representation of the failure counter compared to time, such that the defense pipeline 500 only engages a defensive action if the failure counter increments a specified amount in a specified period of time. For example, the threshold value may be a first amount of failure counter increments for a pointer during a second number of minutes. In this example, the defense pipeline 500 may only engage a defensive action if the failure counter increments ten times during a two-minute period. It is also contemplated that the defense pipeline 500 may use some other measurement of time. For instance, the threshold value may be five failure counter increments during 10,000 clock cycles. As discussed, the number of failure counter increments during a specified period of time may be measured by the tracker 502.

It is also contemplated that the defense pipeline 500 may utilize more than one threshold, each threshold associated with a different level of protection. For example, a first threshold may be a first value, a second threshold may be a second value, and a third threshold may be a third value. In this example, the defense pipeline 500 may engage one defensive action based on the failure counter exceeding the first value, and then the defense pipeline 500 may engage a different defensive action based on the failure counter exceeding the second value.

In one possible defensive action, the defense pipeline 500 masks the latency of a successful speculatively executed pointer authentication instruction by introducing a delay that matches the delay of a failed speculatively executed pointer authentication instruction. As a result, an attacker cannot discern the result of the speculatively executed pointer authentication instruction by measuring the latency produced by the malicious gadget. For example, the defensive action may include delaying execution of the defense pipeline 500 by an amount of time corresponding to a failed pointer authentication in response to the failure counter having a first value that is lower than a second value. The defense pipeline 500 may implement the delay module 508 to produce the delay.

Another possible defensive action may include issuing a fetch or jump instruction to a pointer as if a speculatively executed pointer authentication instruction succeeded. However, instead of fetching data assigned to the pointer address, the defense pipeline 500 instead returns pseudo random data from the cache (e.g., data that has no particular meaning). For instance, the defense pipeline 500 may implement the pseudo random number generator 510 to return the pseudo random data. The defense pipeline 500 may also issue a jump instruction to a sandbox environment, e.g., a quarantined area in code space. The combination of fetch and jump instructions hides the latency penalty associated with pointer authentication executions, making successful and unsuccessful pointer authentication side channel signatures indistinguishable.

Because the latency penalty associated with pointer authentication executions is monitored to conduct brute force attacks, hiding the latency penalty helps to defend against attackers. For example, the defense pipeline 500 may perform an instruction not associated with a pointer over a period of time that corresponds to a successful pointer authentication in response to the failure counter having a second value that is higher than a first value. The defense pipeline 500 discards the result of the instruction without committing the result to the data cache. The defense pipeline 500 may then be flushed by discarding all the instruction data loaded into the defense pipeline 500.

Another possible defensive action includes masking channel signatures (e.g., memory transactions to the pointer) by waiting until the speculation or branch is resolved. For instance, the defense pipeline 500 may increase the response latency between the defense pipeline 500 and the cache until the speculative execution is resolved. If the failure counter continues to increase, the defense pipeline 500 may stop speculatively executing pointer authentication instructions. For example, the defense pipeline 500 may refuse a further pointer authentication via the speculative path in response to the failure counter having a third value that is higher than a second value and a first value.

In the example illustrated with respect to FIGS. 7A, 7B, and 7C, an attacker attempts to perform a PACMAN attack on a core implementing a defense pipeline, such as the defense pipeline 500 illustrated with respect to FIG. 5. The first phase of the attack, illustrated with respect to the first fork 700 in FIG. 7A, is similar to the first phase of the attack illustrated with respect to FIG. 4A. That is, the attacker trains the branch predictor 302 to predict that the first path 706a, rather than the second path 708a, is the next path in an instruction queue. The second phase of the attack, illustrated with respect to the second fork 702 in FIG. 7B, is similar to the second phase of the attack illustrated with respect to FIG. 4B. That is, the attacker inserts a PACMAN gadget into the speculatively executed first path 706b, and the speculative engine 306 executes the PACMAN gadget. The third phase of the PACMAN attack is illustrated with respect to the third fork 704 in FIG. 7C. In FIG. 7C, the PACMAN gadget attempts to perform a pointer authentication (PAUTH) instruction. However, using one or more of the techniques described in this disclosure, the defense pipeline 500 detects the attack. The defense pipeline 500 may then perform any number of the discussed defensive actions.

Figure 8:
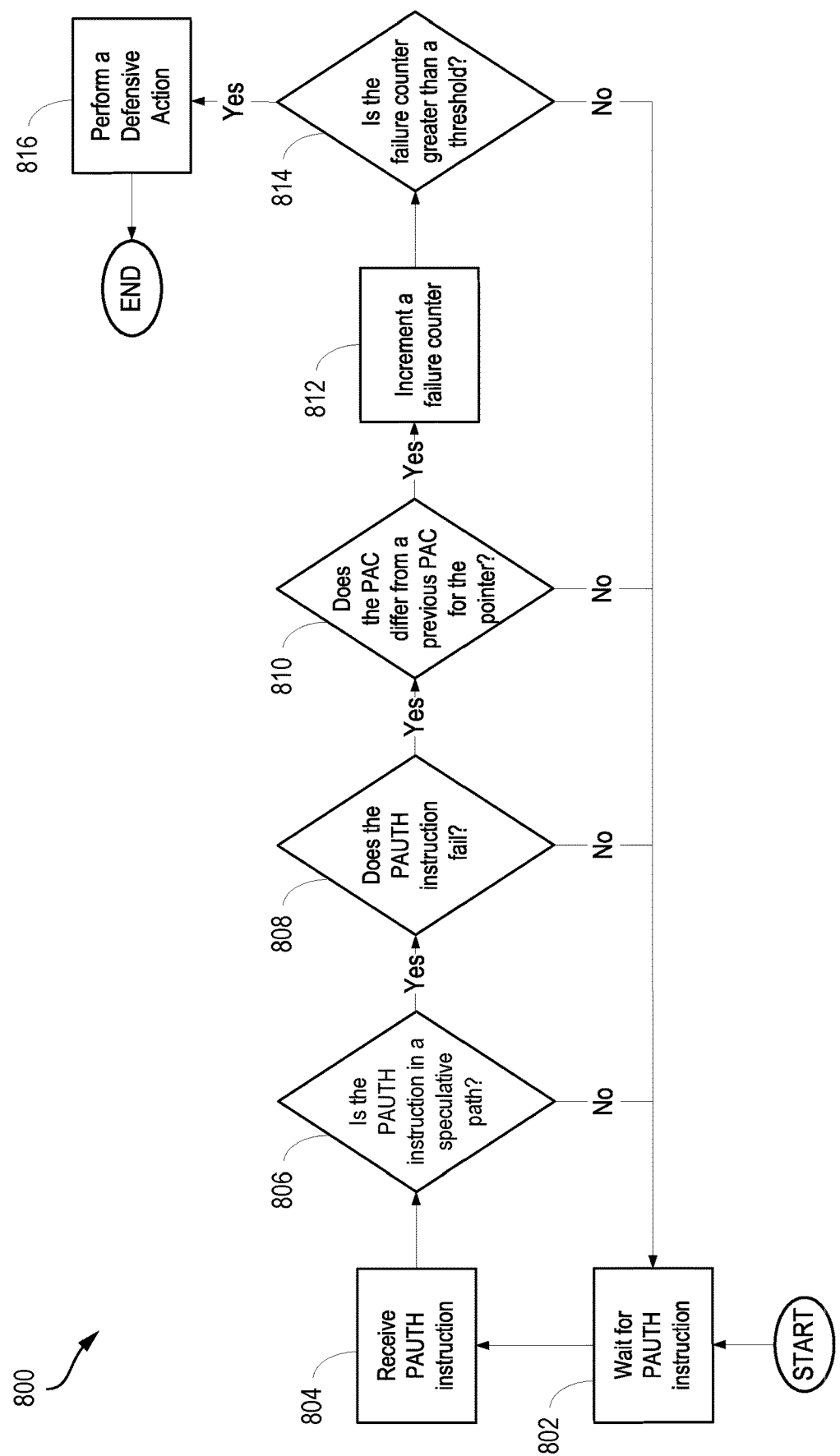
FIG. 8 is a flow diagram illustrating a decision pipeline, in accordance with various aspects of the present disclosure.

FIG. 8 is a flow diagram illustrating a decision pipeline 800, in accordance with various aspects of the present disclosure. As illustrated in FIG. 8, the decision pipeline 800 begins at block 802 by waiting to receive a pointer authentication (PAUTH) instruction. For example, a processor core may be configured to execute a variety of instructions, including pointer authentication instructions. At block 804, the decision pipeline 800 receives a pointer authentication instruction, e.g., an instruction to verify the integrity of a pointer using a pointer authentication code (PAC).

At block 806, the decision pipeline 800 determines if the pointer authentication instruction is in a speculative path. If the pointer authentication instruction is in a speculative path, the decision pipeline 800 moves to block 808. If the pointer authentication instruction is not in a speculative path, the decision pipeline 800 returns to block 802 to wait for a new pointer authentication instruction. At block 808, the decision pipeline 800 determines if the pointer authentication instruction fails. For example, the decision pipeline 800 may determine whether the provided pointer authentication code fails for the provided pointer. If the pointer authentication instruction fails, the decision pipeline 800 moves to block 810. If the pointer authentication instruction succeeds, the decision pipeline 800 returns to block 802 to wait for a new pointer authentication instruction.

At block 810, the decision pipeline 800 determines whether the pointer authentication code (PAC) for the pointer differs from a previous pointer authentication code for the pointer. The decision pipeline 800, for example, may implement a tracking component, such as the tracker 502 discussed with respect to FIG. 5. If the pointer authentication code for the pointer differs from a previous pointer authentication code for the pointer, the decision pipeline 800 increments a failure counter at block 812. Then, the decision pipeline 800 moves to block 814. However, if the pointer authentication code for the pointer does not differ from a previous pointer authentication code for the pointer, the decision pipeline 800 returns to block 802 to wait for a new pointer authentication instruction.

At block 814, the decision pipeline 800 determines if the failure counter is greater than a threshold value. For example, if the threshold value is ten, the decision pipeline 800 may determine that the threshold value is satisfied once the failure counter reaches eleven. As mentioned, the threshold value may be based on a quantity of failed pointer authentications in a specified period of time. For example, the threshold value may be equivalent to ten failures in the previous two minutes. If the failure counter is greater than a threshold, the decision pipeline 800 moves to block 816. If the failure counter is not greater than a threshold, the decision pipeline 800 returns to block 802. Once the decision pipeline 800 moves to block 816, the decision pipeline 800 performs a defensive action. For example, the decision pipeline 800 may perform any number of the defensive actions discussed with respect to FIGS. 7A-7C. After the decision pipeline 800 performs a defensive action, the decision pipeline 800 may end, as illustrated in FIG. 8, or the decision pipeline 800 may return to block 802 to wait for another pointer authentication instruction.

Figure 9:
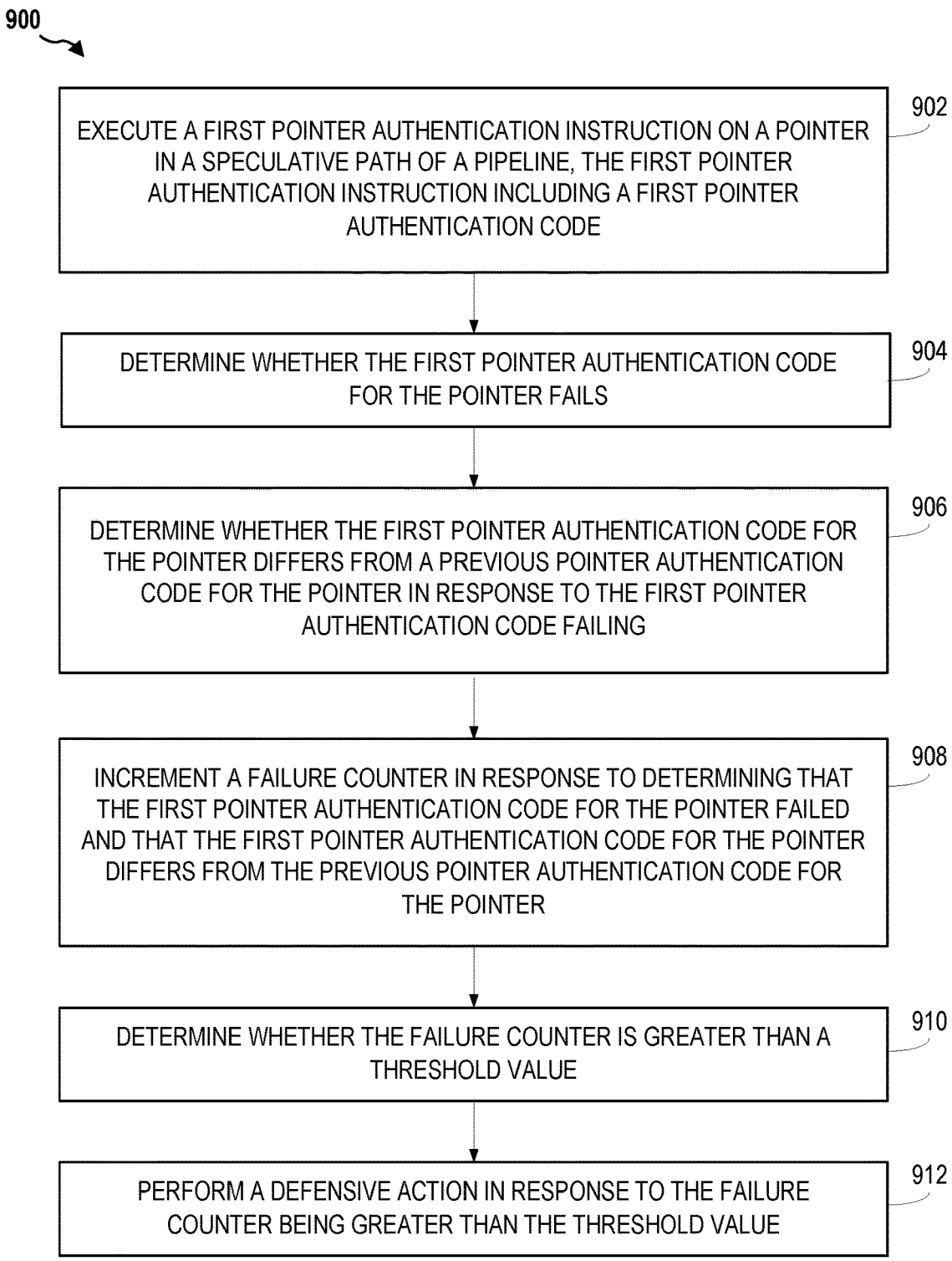
FIG. 9 is a flow diagram illustrating an example process performed, for example, by a processor, in accordance with various aspects of the present disclosure.

FIG. 9 is a flow diagram illustrating an example process 900 performed, in accordance with various aspects of the present disclosure. The process 900 may be performed by one or more processors such as the CPU 102, GPU 104, and/or other processing unit.

In some aspects, the process 900 may include executing a first pointer authentication instruction on a pointer in a speculative path of a pipeline, the first pointer authentication instruction including a first pointer authentication code (block 902). For example, a core, executing an instruction pipeline, may speculatively execute a pointer authentication instruction on a pointer using a pointer authentication code. The process 900 may also include determining whether the first pointer authentication code for the pointer fails (block 904). The first pointer authentication code may fail if the pointer authentication code does not match the provided pointer.

The process 900 may further include determining whether the first pointer authentication code for the pointer differs from a previous pointer authentication code for the pointer in response to the first pointer authentication code failing (block 906). A device may, for example, implement a tracking component, such as the tracker 502 discussed with respect to FIG. 5. The tracker component may track pointers and pointer authentication codes, enabling the device to determine whether a pointer authentication code differs from a previous pointer authentication code.

The process 900 may still further include incrementing a failure counter in response to determining that the first pointer authentication code for the pointer failed and that the first pointer authentication code for the pointer differs from the previous pointer authentication code for the pointer (block 908). However, if the pointer authentication is successful, the process 900 may include setting the failure counter to zero or some other predefined quantity. The process 900 may also include determining whether the failure counter is greater than a threshold value (block 910). As discussed, the threshold value may represent some quantity of failed pointer authentications, or the threshold value may represent a quantity of failed pointer authentications over time. For example, the threshold value may be five failures in a span of ten minutes.

The process 900 may additionally include performing a defensive action in response to the failure counter being greater than the threshold value (block 912). The defensive action may comprise performing, in response to the failure counter having a second value that is higher than a first value, an instruction not associated with the pointer over a period of time that corresponds to a successful pointer authentication, the instruction producing a result. The defensive action may additionally comprise discarding the result without committing the result to a data cache and discarding all instruction data loaded in the pipeline.

Figure 10:
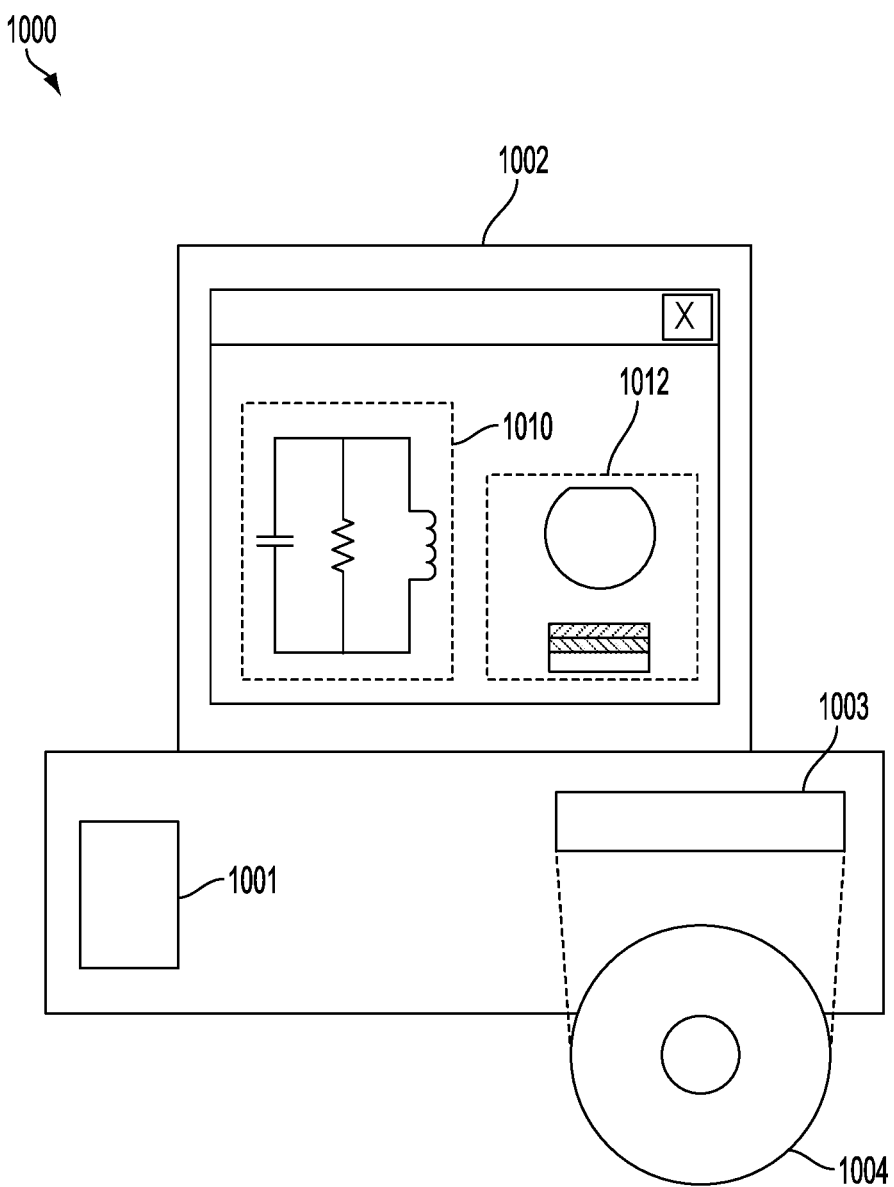
FIG. 10 is a block diagram illustrating a design workstation used for circuit, layout, and logic design of components, in accordance with various aspects of the present disclosure.

FIG. 10 is a block diagram illustrating a design workstation 1000 used for circuit, layout, and logic design of a semiconductor component, such as a processor core implementing the defense pipeline 500, disclosed above. The design workstation 1000 includes a hard disk 1001 containing operating system software, support files, and design software such as Cadence or OrCAD. The design workstation 1000 also includes a display 1002 to facilitate design of a circuit 1010 or a semiconductor component 1012, such as the processor core implementing the defense pipeline 500. A storage medium 1004 is provided for tangibly storing the design of the circuit 1010 or the semiconductor component 1012 (e.g., the PLD). The design of the circuit 1010 or the semiconductor component 1012 may be stored on the storage medium 1004 in a file format such as GDSII or GERBER. The storage medium 1004 may be a CD-ROM, DVD, hard disk, flash memory, or other appropriate device. Furthermore, the design workstation 1000 includes a drive apparatus 1003 for accepting input from or writing output to the storage medium 1004.

Data recorded on the storage medium 1004 may specify logic circuit configurations, pattern data for photolithography masks, or mask pattern data for serial write tools such as electron beam lithography. The data may further include logic verification data such as timing diagrams or net circuits associated with logic simulations. Providing data on the storage medium 1004 facilitates the design of the circuit 1010 or the semiconductor component 1012 by decreasing the number of processes for designing semiconductor wafers.

EXAMPLE ASPECTS

Aspect 1: A method, comprising: executing a first pointer authentication instruction on a pointer in a speculative path of a pipeline, the first pointer authentication instruction including a first pointer authentication code; determining whether the first pointer authentication code for the pointer fails; determining whether the first pointer authentication code for the pointer differs from a previous pointer authentication code for the pointer in response to the first pointer authentication code failing; incrementing a failure counter in response to determining that the first pointer authentication code for the pointer failed and that the first pointer authentication code for the pointer differs from the previous pointer authentication code for the pointer; determining whether the failure counter is greater than a threshold value; and performing a defensive action in response to the failure counter being greater than the threshold value.

Aspect 2: The method of Aspect 1, in which the defensive action comprises delaying execution of the pipeline by an amount of time corresponding to a failed pointer authentication in response to the failure counter having a first value that is lower than a second value.

Aspect 3: The method of Aspect 1 or 2, in which the defensive action comprises: performing, in response to the failure counter having a second value that is higher than a first value, an instruction not associated with the pointer over a period of time that corresponds to a successful pointer authentication, the instruction producing a result; and discarding the result without committing the result to a data cache.

Aspect 4: The method of any of the Aspects 1-3, in which the defensive action further comprises discarding all instruction data loaded in the pipeline.

Aspect 5: The method of any of the Aspects 1-4, in which the defensive action comprises: increasing a response latency between the pipeline and a cache; and refusing a further pointer authentication via the speculative path in response to the failure counter having a third value that is higher than a second value and a first value.

Aspect 6: The method of any of the Aspects 1-5, further comprising setting the failure counter to zero when the first pointer authentication code was successful.

Aspect 7: The method of any of the Aspects 1-6, in which the threshold value is based on a quantity of failed pointer authentications in a specified period of time.

Aspect 8: An apparatus, comprising: at least one memory; and at least one processor coupled to the at least one memory, the at least one processor configured to: execute a first pointer authentication instruction on a pointer in a speculative path of a pipeline, the first pointer authentication instruction including a first pointer authentication code; determine whether the first pointer authentication code for the pointer fails; determine whether the first pointer authentication code for the pointer differs from a previous pointer authentication code for the pointer in response to the first pointer authentication code failing; increment a failure counter in response to determining that the first pointer authentication code for the pointer failed and that the first pointer authentication code for the pointer differs from the previous pointer authentication code for the pointer; determine whether the failure counter is greater than a threshold value; and perform a defensive action in response to the failure counter being greater than the threshold value.

Aspect 9: The apparatus of Aspect 8, in which the at least one processor is configured to perform the defensive action by delaying execution of the pipeline by an amount of time corresponding to a failed pointer authentication in response to the failure counter having a first value that is lower than a second value.

Aspect 10: The apparatus of Aspect 8 or 9, in which the at least one processor is configured to perform the defensive action by performing, in response to the failure counter having a second value that is higher than a first value, an instruction not associated with the pointer over a period of time that corresponds to a successful pointer authentication, the instruction producing a result; and discarding the result without committing the result to a data cache.

Aspect 11: The apparatus of any of the Aspects 8-10, in which the at least one processor is configured to perform the defensive action by discarding all instruction data loaded in the pipeline.

Aspect 12: The apparatus of any of the Aspects 8-11, in which the at least one processor is configured to perform the defensive action by increasing a response latency between the pipeline and a cache; and refusing a further pointer authentication via the speculative path in response to the failure counter having a third value that is higher than a second value and a first value.

Aspect 13: The apparatus of any of the Aspect 8-12, in which the at least one processor is further configured to set the failure counter to zero when the first pointer authentication code was successful.

Aspect 14: The apparatus of any of the Aspects 8-13, in which the threshold value is based on a quantity of failed pointer authentications in a specified period of time.

Aspect 15: An apparatus, comprising; means for executing a first pointer authentication instruction on a pointer in a speculative path of a pipeline, the first pointer authentication instruction including a first pointer authentication code; means for determining whether the first pointer authentication code for the pointer fails; means for determining whether the first pointer authentication code for the pointer differs from a previous pointer authentication code for the pointer in response to the first pointer authentication code failing; means for incrementing a failure counter in response to determining that the first pointer authentication code for the pointer failed and that the first pointer authentication code for the pointer differs from the previous pointer authentication code for the pointer; means for determining whether the failure counter is greater than a threshold value; and means for performing a defensive action in response to the failure counter being greater than the threshold value.

Aspect 16: The apparatus of Aspect 15, in which the means for performing the defensive action comprises means for delaying execution of the pipeline by an amount of time corresponding to a failed pointer authentication in response to the failure counter having a first value that is lower than a second value.

Aspect 17: The apparatus of Aspect 15 or 16, in which the means for performing the defensive action comprises: means for performing, in response to the failure counter having a second value that is higher than a first value, an instruction not associated with the pointer over a period of time that corresponds to a successful pointer authentication, the instruction producing a result; means for discarding the result without committing the result to a data cache; and means for discarding all instruction data loaded in the pipeline.

Aspect 18: The apparatus of any of the Aspects 15-17, in which the means for performing the defensive action comprises: means for increasing a response latency between the pipeline and a cache; and means for refusing a further pointer authentication via the speculative path in response to the failure counter having a third value that is higher than a second value and a first value.

Aspect 19: The apparatus of any of the Aspects 15-18, further comprising means for setting the failure counter to zero when the first pointer authentication code was successful.

Aspect 20: The apparatus of any of the Aspects 15-19, in which the threshold value is based on a quantity of failed pointer authentications in a specified period of time.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used, the term "determining" encompasses a wide variety of actions. For example, "determining" may include calculating, computing, processing, deriving, investigating, looking up (e.g., looking up in a table, a database, or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used, include compact disc (CD), laser disc, optical disc, digital versatile disc (DVD), floppy disk, and Blu-ray® disc where disks usually reproduce data magnetically, while discs reproduce data optically with lasers. Thus, in some aspects, computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented. For example, such a computer program product may comprise a computer-readable medium having instructions stored (and/or encoded) thereon, the instructions being executable by one or more processors to perform the operations described. For certain aspects, the computer program product may include packaging material.

Further, it should be appreciated that modules and/or other appropriate means for performing the methods and techniques described can be downloaded and/or otherwise obtained by a user terminal and/or base station as applicable. For example, such a device can be coupled to a server to facilitate the transfer of means for performing the methods described. Alternatively, various methods described can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. A method, comprising:
executing a first pointer authentication instruction on a pointer in a speculative path of a pipeline, the first pointer authentication instruction including a first pointer authentication code;
determining whether the first pointer authentication code for the pointer fails;
determining whether the first pointer authentication code for the pointer differs from a previous pointer authentication code for the pointer in response to the first pointer authentication code failing;
incrementing a failure counter in response to determining that the first pointer authentication code for the pointer failed and that the first pointer authentication code for the pointer differs from the previous pointer authentication code for the pointer;
determining whether the failure counter is greater than a threshold value; and
performing a defensive action in response to the failure counter being greater than the threshold value.

2. The method of claim 1, in which the defensive action comprises delaying execution of the pipeline by an amount of time corresponding to a failed pointer authentication in response to the failure counter having a first value that is lower than a second value.

3. The method of claim 1, in which the defensive action comprises:
performing, in response to the failure counter having a second value that is higher than a first value, an instruction not associated with the pointer over a period of time that corresponds to a successful pointer authentication, the instruction producing a result; and
discarding the result without committing the result to a data cache.

4. The method of claim 3, in which the defensive action further comprises discarding all instruction data loaded in the pipeline.

5. The method of claim 1, in which the defensive action comprises:
increasing a response latency between the pipeline and a cache; and
refusing a further pointer authentication via the speculative path in response to the failure counter having a third value that is higher than a second value and a first value.

6. The method of claim 1, further comprising setting the failure counter to zero when the first pointer authentication code was successful.

7. The method of claim 1, in which the threshold value is based on a quantity of failed pointer authentications in a specified period of time.

8. An apparatus, comprising:
at least one memory; and
at least one processor coupled to the at least one memory, the at least one processor configured to:
execute a first pointer authentication instruction on a pointer in a speculative path of a pipeline, the first pointer authentication instruction including a first pointer authentication code;
determine whether the first pointer authentication code for the pointer fails;
determine whether the first pointer authentication code for the pointer differs from a previous pointer authentication code for the pointer in response to the first pointer authentication code failing;
increment a failure counter in response to determining that the first pointer authentication code for the pointer failed and that the first pointer authentication code for the pointer differs from the previous pointer authentication code for the pointer;
determine whether the failure counter is greater than a threshold value; and
perform a defensive action in response to the failure counter being greater than the threshold value.

9. The apparatus of claim 8, in which the at least one processor is configured to perform the defensive action by delaying execution of the pipeline by an amount of time corresponding to a failed pointer authentication in response to the failure counter having a first value that is lower than a second value.

10. The apparatus of claim 8, in which the at least one processor is configured to perform the defensive action by performing, in response to the failure counter having a second value that is higher than a first value, an instruction not associated with the pointer over a period of time that corresponds to a successful pointer authentication, the instruction producing a result; and discarding the result without committing the result to a data cache.

11. The apparatus of claim 10, in which the at least one processor is configured to perform the defensive action by discarding all instruction data loaded in the pipeline.

12. The apparatus of claim 8, in which the at least one processor is configured to perform the defensive action by increasing a response latency between the pipeline and a cache; and refusing a further pointer authentication via the speculative path in response to the failure counter having a third value that is higher than a second value and a first value.

13. The apparatus of claim 8, in which the at least one processor is further configured to set the failure counter to zero when the first pointer authentication code was successful.

14. The apparatus of claim 8, in which the threshold value is based on a quantity of failed pointer authentications in a specified period of time.

15. An apparatus, comprising:
means for executing a first pointer authentication instruction on a pointer in a speculative path of a pipeline, the first pointer authentication instruction including a first pointer authentication code;
means for determining whether the first pointer authentication code for the pointer fails;
means for determining whether the first pointer authentication code for the pointer differs from a previous pointer authentication code for the pointer in response to the first pointer authentication code failing;
means for incrementing a failure counter in response to determining that the first pointer authentication code for the pointer failed and that the first pointer authentication code for the pointer differs from the previous pointer authentication code for the pointer;
means for determining whether the failure counter is greater than a threshold value; and
means for performing a defensive action in response to the failure counter being greater than the threshold value.

16. The apparatus of claim 15, in which the means for performing the defensive action comprises means for delaying execution of the pipeline by an amount of time corresponding to a failed pointer authentication in response to the failure counter having a first value that is lower than a second value.

17. The apparatus of claim 15, in which the means for performing the defensive action comprises:
  means for performing, in response to the failure counter having a second value that is higher than a first value, an instruction not associated with the pointer over a period of time that corresponds to a successful pointer authentication, the instruction producing a result;
  means for discarding the result without committing the result to a data cache; and
  means for discarding all instruction data loaded in the pipeline.

18. The apparatus of claim 15, in which the means for performing the defensive action comprises:
  means for increasing a response latency between the pipeline and a cache; and
  means for refusing a further pointer authentication via the speculative path in response to the failure counter having a third value that is higher than a second value and a first value.

19. The apparatus of claim 15, further comprising means for setting the failure counter to zero when the first pointer authentication code was successful.

20. The apparatus of claim 15, in which the threshold value is based on a quantity of failed pointer authentications in a specified period of time.

* * * * *